UNITED STATES PATENT OFFICE.

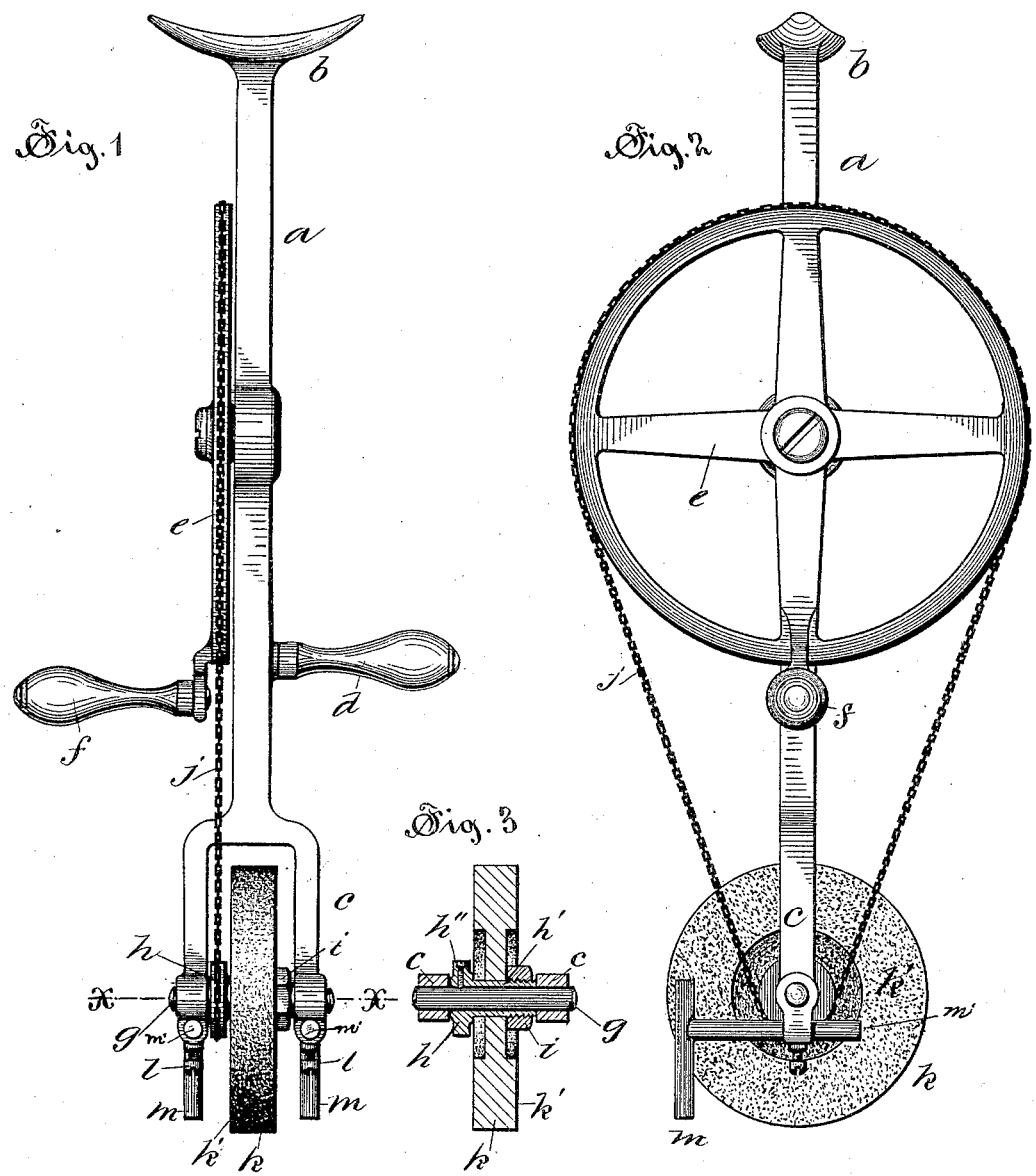

OWEN H. JONES, OF HARTFORD, CONNECTICUT.

MOWING-MACHINE-KNIFE GRINDER.

SPECIFICATION forming part of Letters Patent No. 411,245, dated September 17, 1889.

Application filed June 22, 1888. Serial No. 277,884. (No model.)

*To all whom it may concern:*

Be it known that I, OWEN H. JONES, a citizen of the United States, residing at Hartford, in the county of Hartford and State of Connecticut, have invented certain new and useful Improvements in Mowing-Machine-Knife Grinders, of which the following is a specification.

My invention relates to the class of grinders which are used to grind the knives and fingers of agricultural implements, as mowing-machines, reapers, and harvesters.

The object of the invention is to provide a grinder for such purposes that is simple and cheap in construction, that is portable, easily and quickly used by any person, and that can be used in places where prior grinders will not reach without removing the knives from the knife-bar or the fingers from the finger-bar.

Referring to the accompanying drawings, Figure 1 is an edge view of the implement. Fig. 2 is a side view of the same. Fig. 3 is a vertical section on the plane denoted by line $x\,x$ of Fig. 1.

The letter $a$ denotes a shank having on one end the body-rest $b$ and on the other the fork $c$, which parts are preferably cast integral of iron.

$d$ is a handle attached to one side of the shank, and $e$ is a driving-wheel mounted on a lug cast integral with the shank on the side opposite the handle. This driving-wheel, which is preferably a cast-iron sprocket-wheel of about thirty-six teeth, has a driving-handle $f$. The fork $c$ is perforated laterally, and the ends of the spindle $g$ are inserted in these perforations.

$h$ is a pulley or small sprocket-wheel of about six teeth held fast to the spindle $g$ by the set-screw $h''$.

$j$ is a connection between the driving-wheel $e$ and pulley $h$, which in the form shown is an endless chain.

$k$ is an abrading-wheel, preferably formed of emery, which is mounted upon a sleeve $h'$, that projects from the pulley $h$, the end of this sleeve being threaded and bearing a nut $i$, which clamps the abrading-wheel fast to the pulley. When the set-screw $h''$ is loosened, the spindle is slipped from its bearings and the pulley and wheel drop from between the fork. The abrading-wheel is formed with a recess in each side about the center to give a better balance to the wheel during rotation, also to form a grinding-surface $k'$ on the sides of the wheel, which is used for grinding the edges of the fingers or guards without removing them from the machine, the edge being used to grind the blades without removing them from the blade-bar.

The letters $m\,m$ denote a pair of shoes of T shape, and preferably formed of round iron, the legs $m'$ of which pass through the ends of the fork $c$, as near the spindle $g$ as possible, and are held at any desired height by the set-screws $l\,l$.

In using the device the shoes are adjusted one higher than the other, which, when placed on an even surface, as a blade-bar, inclines the wheel and causes it to grind on an angle, which gives the desired bevel to the cutting-edge of a blade. The device is grasped in one hand by the handle $d$ and held firmly with the rest $b$ against the body of the user, the shoes, as before stated, being properly adjusted and resting on the bar of the machine. When the driving-wheel is rotated, motion is imparted to the pulley, which in turn revolves the abrading-wheel that grinds the metal, against which it is placed on an angle proportional to the difference in height of the two shoes. The shoes being round rods, are capable of being turned to any angle and of resting firmly on small surfaces.

I claim as my invention—

1. In a grinder, the combination, with the shank formed with a bifurcated lower end, the branches of which are formed with opposite bearings, of a spindle engaged in said bearings, a sleeve secured upon said spindle and provided with an integral pulley at one end, a nut engaged upon the opposite end of said sleeve, an abrading-wheel secured to said sleeve between said nut and said pulley, a drive-wheel, and a connection between said drive-wheel and the pulley, substantially as set forth.

2. In a grinder, the combination, with a shank $a$, provided with a bifurcated lower end having opposite journal-bearings, of a spindle engaged in said bearings, an abrading-wheel rotating about said spindle, bearings provided at the lower ends of the bifurcated ends at right angles to the spindle-bearings, T-shaped shoes having their legs $m'$ adjustably secured in said bearings, and means for rotating the said abrading-wheel, substantially as set forth.

OWEN H. JONES.

Witnesses:
H. R. WILLIAMS,
ALLIE S. WILLIAMS.